(12) United States Patent
Szoucsek et al.

(10) Patent No.: US 11,168,841 B2
(45) Date of Patent: Nov. 9, 2021

(54) SERVICE DEVICE FOR A PRESSURE VESSEL SYSTEM

(71) Applicant: Bayerische Motoren Werke Aktiengesellschaft, Munich (DE)

(72) Inventors: Klaus Szoucsek, Haimhausen (DE); Andreas Pelger, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/933,208

(22) Filed: Mar. 22, 2018

(65) Prior Publication Data

US 2018/0209590 A1 Jul. 26, 2018

Related U.S. Application Data

(63) Continuation of application No. PCT/EP2016/068496, filed on Aug. 3, 2016.

(30) Foreign Application Priority Data

Sep. 23, 2015 (DE) .................. 10 2015 218 235.5

(51) Int. Cl.
 *F17C 13/12* (2006.01)
 *F17C 13/02* (2006.01)
 *B67D 7/32* (2010.01)

(52) U.S. Cl.
 CPC .......... *F17C 13/123* (2013.01); *B67D 7/3209* (2013.01); *F17C 13/02* (2013.01);
 (Continued)

(58) Field of Classification Search
 CPC ................ F17C 13/123; F17C 13/02; F17C 2270/0184; F17C 2270/0168;
 (Continued)

(56) References Cited

U.S. PATENT DOCUMENTS 5,323,752 A 6/1994 Von Herrmann et al.
5,988,206 A * 11/1999 Bare ................ B60K 15/03006
 123/527

(Continued)

FOREIGN PATENT DOCUMENTS

CN 1501535 A 6/2004
CN 1862073 A 11/2006
(Continued)

OTHER PUBLICATIONS

PCT/EP2016/068496, International Search Report dated Oct. 13, 2016 (Three (3) pages).

(Continued)

*Primary Examiner* — Marina A Tietjen
(74) *Attorney, Agent, or Firm* — Crowell & Moring LLP

(57) ABSTRACT

A service device for a pressure vessel system of a motor vehicle includes a service-device-side refueling coupling part which is connectable to a motor-vehicle-side refueling coupling part of the motor vehicle and a controller for activating the pressure vessel system. A method for the service of the pressure vessel system includes producing a connection between the service device and the pressure vessel system and activating the pressure vessel system by the service device.

8 Claims, 1 Drawing Sheet

(52) U.S. Cl.
CPC .. *B67D 2007/329* (2013.01); *F17C 2205/037* (2013.01); *F17C 2221/012* (2013.01); *F17C 2221/033* (2013.01); *F17C 2223/0115* (2013.01); *F17C 2223/0123* (2013.01); *F17C 2223/0161* (2013.01); *F17C 2223/033* (2013.01); *F17C 2223/035* (2013.01); *F17C 2223/036* (2013.01); *F17C 2227/044* (2013.01); *F17C 2250/03* (2013.01); *F17C 2250/032* (2013.01); *F17C 2250/043* (2013.01); *F17C 2250/0439* (2013.01); *F17C 2260/015* (2013.01); *F17C 2260/038* (2013.01); *F17C 2260/042* (2013.01); *F17C 2270/0168* (2013.01); *F17C 2270/0184* (2013.01); *Y02E 60/32* (2013.01)

(58) Field of Classification Search
CPC .......... F17C 2260/038; F17C 2260/015; F17C 2250/0439; F17C 2250/043; F17C 2250/032; F17C 2250/03; F17C 2227/044; F17C 2223/036; F17C 2223/035; F17C 2223/033; F17C 2223/0161; F17C 2223/0123; F17C 2223/0115; F17C 2221/033; B67D 7/3209; B67D 2007/329
See application file for complete search history.

(56) References Cited

U.S. PATENT DOCUMENTS

| | | | |
|---|---|---|---|
| 6,082,400 A | 7/2000 | Tocha | |
| 7,059,364 B2 | 6/2006 | Kountz et al. | |
| 8,561,453 B2* | 10/2013 | Hobmeyr | G01L 27/005 137/552 |
| 2003/0233206 A1* | 12/2003 | White | F17C 5/007 702/116 |
| 2004/0049982 A1 | 3/2004 | Shimizu et al. | |
| 2013/0139897 A1 | 6/2013 | Kim et al. | |
| 2014/0130938 A1* | 5/2014 | Luparello | F17C 5/007 141/69 |
| 2014/0216599 A1* | 8/2014 | Loewenthal | F17C 5/00 141/4 |
| 2015/0184804 A1* | 7/2015 | Handa | F17C 13/028 141/1 |
| 2016/0010799 A1* | 1/2016 | Adler | F17C 7/00 73/37 |

FOREIGN PATENT DOCUMENTS

| | | |
|---|---|---|
| CN | 101 319 752 A | 12/2008 |
| DE | 197 27 652 A1 | 1/1999 |
| DE | 101 42 757 C1 | 4/2003 |
| DE | 10 2008 019 594 A1 | 10/2009 |
| DE | 10 2011 111 610 A1 | 3/2012 |
| DE | 10 2012 010 174 A1 | 11/2013 |
| DE | 11 2013 002 339 T5 | 3/2015 |
| DE | 10 2014 226 959 A1 | 7/2015 |
| DE | 10 2018 212 021 B3 | 10/2019 |
| EP | 1 546 601 B1 | 6/2005 |
| WO | WO 97/37117 A1 | 10/1997 |
| WO | WO 2005/077812 A1 | 8/2005 |
| WO | WO 2011/092562 A2 | 8/2011 |
| WO | WO 2013/161318 A1 | 10/2013 |

OTHER PUBLICATIONS

German Search Report issued in German counterpart application No. 10 2015 218 235.5 dated Apr. 27, 2016, with Statement of Relevancy (Eight (8) pages).

Chinese Office Action issued in Chinese counterpart application No. 201680054738.3 dated May 24, 2019, with partial English translation (Nine (9) pages).

German-language European Office Action issued in European application No. 16 750 146.9-1010 dated Nov. 12, 2020 (Seven (7) pages).

Chinese Office Action issued in Chinese application No. 202010741017.8 dated Jun. 29, 2021, with English translation (Fifteen (15) pages).

* cited by examiner

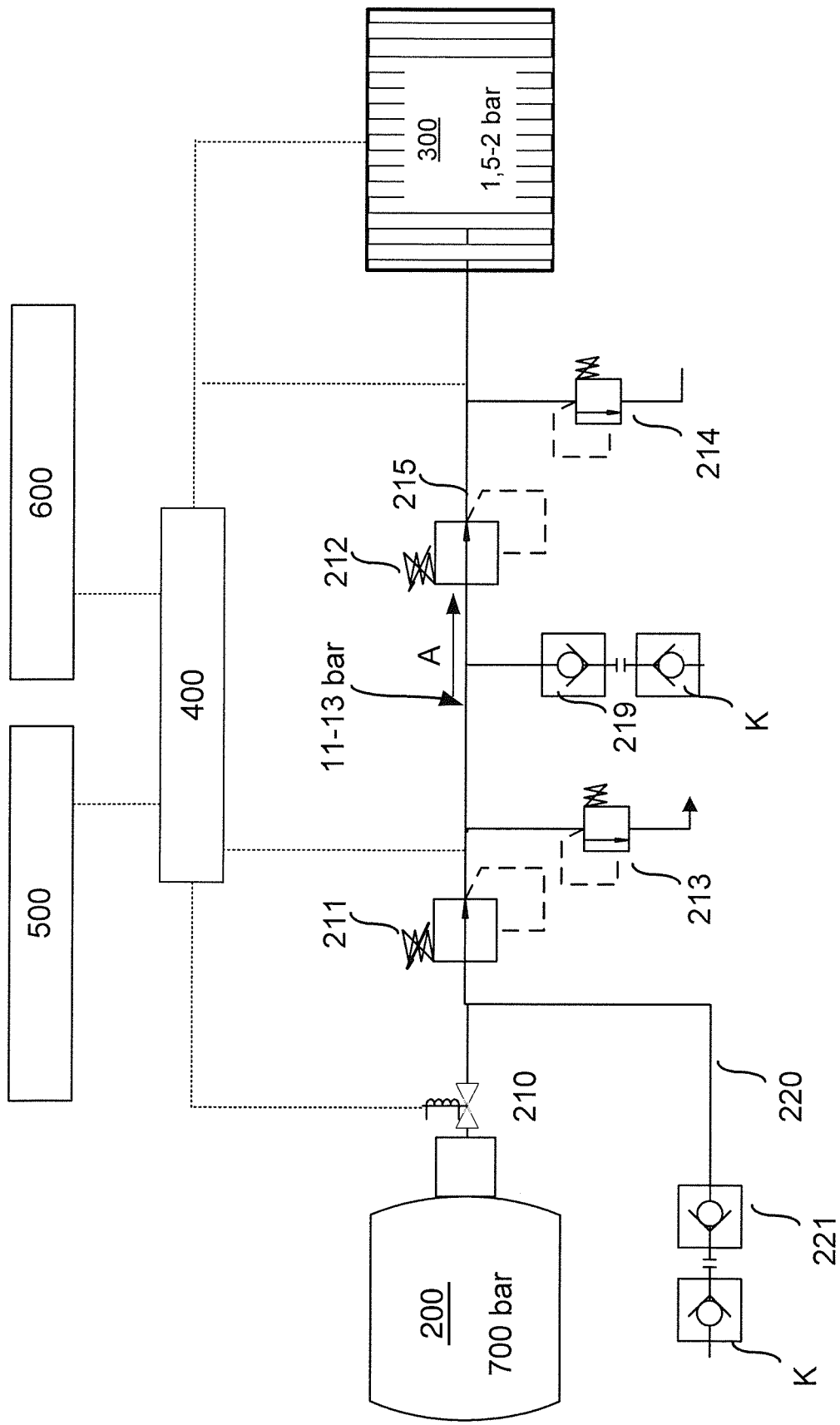

SERVICE DEVICE FOR A PRESSURE VESSEL SYSTEM

CROSS REFERENCE TO RELATED APPLICATIONS

This application is a continuation of PCT International Application No. PCT/EP2016/068496, filed Aug. 3, 2016, which claims priority under 35 U.S.C. § 119 from German Patent Application No. 10 2015 218 235.5, filed Sep. 23, 2015, the entire disclosures of which are herein expressly incorporated by reference.

BACKGROUND AND SUMMARY OF THE INVENTION

The technology disclosed here relates to a service device for a pressure vessel system, in particular a cryogenic pressure vessel system. Furthermore, a method for the service of a pressure vessel system is disclosed.

Cryogenic pressure vessel systems are known from the prior art. They are used, for example, for motor vehicles in which a fuel which is gaseous under environmental conditions is stored cryogenically and therefore in the liquid or supercritical state of aggregation. For example, EP 1 546 601 B1 discloses such a pressure vessel. For refueling, use is made of special refueling couplings, as shown, for example, in the documents DE 19727652 A1 and WO05/077812 A1. DE 11 2013 002 339 T5, WO 2011/092562 A2 and US 2013/0139897 A1 disclose refueling devices.

During the maintenance of motor vehicles having pressure vessel systems, certain activities have to be carried out with particular care. The ultimate intention is to prevent ignitable gas mixtures forming with the fuel (e.g., hydrogen). This means, for example:

emptying the fuel line system, e.g., the forward flow line between the pressure vessel and the fuel cell;
emptying the pressure vessel (defueling);
inerting the pressure vessel; and
testing the tightness of the pressure vessel.

The risk of an operating error can be reduced by the maintenance workers being qualified. However, if the maintenance work is carried out manually, an operating error cannot be entirely excluded. Furthermore, the individual steps are intensive in terms of time. In order to reduce the risk of cold combustion, the cryogenic pressure vessel system or the cryogenically stored fuel currently has to be heated up to ambient temperature before the beginning of the maintenance work.

It is an object of the technology disclosed here to reduce or to eliminate the disadvantages of the previously known solutions. Further objects emerge from the advantageous effects of the technology disclosed here.

The technology disclosed here relates to a service device for a pressure vessel system of a motor vehicle. Such a pressure vessel system includes at least one pressure vessel for storing fuel for a motor vehicle. Such a pressure vessel can be, for example, a cryogenic pressure vessel or a high-pressure gas vessel.

High-pressure gas vessel systems (also referred to below as "CGH2 system") are designed, substantially at ambient temperatures, to store fuel permanently at a pressure of above approx. 350 barg, furthermore preferably of above approx. 500 barg and particularly preferably of above approx. 700 barg.

A cryogenic pressure vessel (are also called "CcH2 pressure vessels") can store fuel in the liquid or supercritical state of aggregation. A cryogenic pressure vessel is suitable in particular for storing the fuel at cryogenic temperatures lying significantly below the operating temperature (i.e., the temperature range of the vehicle surroundings in which the vehicle is intended to be operated) of the motor vehicle, for example at least 50 kelvin, preferably at least 100 kelvin or at least 150 kelvin below the operating temperature of the motor vehicle (generally approx. −40° C. to approx. +85° C.). The fuel can be, for example, hydrogen which is stored in the cryogenic pressure vessel at temperatures of approx. 34 K to 360 K. The pressure vessel can be used in a motor vehicle which is operated, for example, with compressed natural gas (CNG) or liquefied natural gas (LNG). The cryogenic pressure vessel can in particular comprise an inner vessel which is configured for storage pressures of up to approx. 350 barg, preferably up to approx. 500 barg, and particularly preferably up to approx. 700 barg. In particular, the service device can be designed to be connected to a cryogenic pressure vessel system. For this purpose, materials and components which can be used in the cryogenic temperature window (e.g., the fuel store (see below) and the refueling coupling) have to be provided. Furthermore, additional precautions, such as, for example, additional insulation measures, are expedient.

A service device is a device which is used for the service of a motor vehicle, for example in repair work and/or maintenance work or regular checks. The term service device does not include the normal refueling of a pressure vessel system at a filling station.

The service device includes a service-device-side coupling part (the term "refueling coupling plug" is also used below for simplification although a coupling socket can also be considered to be a service-device-side coupling part) which is designed to be connected to a corresponding motor-vehicle-side coupling part (the term "refueling socket" is also used below for simplification although a coupling plug can also be considered to be a motor-vehicle-side coupling part) of the motor vehicle. Of course, this may involve a refueling coupling part of a refueling coupling, as is already known from the refueling (of CcH2 and/or CGH2) at the filling station, for example a plug, as shown in DE 19727652 A1 or WO05/077812 A1.

A CcH2 refueling coupling can furthermore have a cold finger. After the coupling, the refueling coupling parts advantageously form a closed space. The service-device-side coupling part can expediently comprise a cold finger which is at least partially inserted into the motor-vehicle-side coupling part. The cold finger here is a rod which is accommodated in a service-device-side coupling part, is heat-insulated in relation to the surroundings and guides the cryogenic fuel in its interior. During the coupling operation, it can be arranged set back in the coupling part before it is moved into the motor-vehicle-side coupling part after the coupling. Accordingly, an (electric and/or pneumatic) drive is expediently also provided for the cold finger. The formation of condensate or even icing in the region of the refueling coupling can therefore be reduced or even avoided. Furthermore, a refueling coupling heating device can advantageously be provided.

Furthermore, the service device includes a controller for activating the pressure vessel system. The controller can include an open loop control and/or a closed loop control. The controller is preferably part of the service device. An electrical or electronic activation is therefore expediently involved. The activation can expediently be configured, for example, such that the service device sends controller signals or control signals to the control unit of the pressure vessel system, whereupon the control unit of the pressure vessel system then controls the actuator system (e.g., possible valves) of the pressure vessel system with open loop or closed loop control. The state of the pressure vessel can therefore be advantageously influenced (e.g., depressed, relieved of pressure, etc.) in the service situation with an actuator system already installed. Alternatively, the control functionality could also be integrated with the actuator system in the motor vehicle or with an external computer unit having corresponding software. The service device or the controller can be designed in particular to process the vehicle data (e.g., tank information) and/or to activate the actuator system and sensor system of the motor vehicle or preferably on both systems (motor vehicle and service device). In particular, corresponding electrical controller signals or control signals are sent to the actuator system of the pressure vessel system. The refueling of a pressure vessel by a marked refueling line should not be considered to be a control signal here.

The controller can be configured in particular to activate the shut-off valve of the pressure vessel or another valve of the pressure vessel system.

The controller can be configured to process information about the state of the pressure vessel system. For example, pressure, temperature and/or filling level information or other information is advantageously processed from the controller. For example, control commands for the pressure vessel system can be generated from this information. Furthermore, this information can be used for the diagnostics. For this purpose, the service device can advantageously have a fuel analysis device. A fuel analysis device is designed to analyze the fuel stored in the pressure vessel system. For example, the service device can include at least one sensor which determines the purity of the fuel (e.g., hydrogen purity). During maintenance work, the pressure vessel can be filled with an inert gas. However, for the regular operation of the motor vehicle with a fuel cell, a certain hydrogen content or purity is required. In order to achieve this, a pressure vessel system is "cleaned" as it were (in particular after service work) by pressure change scavenging. Pressure change scavenging is an operation in which the pressure vessel system is repeatedly filled with fuel (e.g., three or five repetitions) to a certain filling degree or filling pressure and is then emptied again.

From the aforementioned state information and further information, e.g., the data of the fuel analysis or the historic (vehicle) data of the pressure vessel system, conclusions may be possible about the state of the pressure vessel system (e.g., quality of the vacuum insulation, state of the reinforcement of the inner container, type of or reason for a vehicle malfunction, remaining service life, etc.). The data obtained or determined can be further evaluated, stored and/or displayed.

If the controller is not integrated in the motor vehicle, it is designed to read the information from a control unit of the motor vehicle (frequently called "tank master"), for example for controlling the pressure vessel system. This may take place via known communication connections, possibly even wirelessly.

The controller can be configured to activate the pressure vessel system in such a manner that the fuel stored in the pressure vessel system is at least partially removed from the motor vehicle. The pressure vessel is preferably emptied to a minimal minimum pressure or entirely. The minimal minimum pressure can be, for example, the minimal pressure which should always be present in the interior of the pressure vessel so that the pressure vessel is not damaged. A device for the semi-automatic expansion of the pressure vessel is therefore preferably involved.

The controller can be configured to at least partially refill the pressure vessel system with fuel after service work. For this purpose, the service device itself can include a fuel store, preferably a cryogenic high pressure container. Alternatively or additionally, the service device can be connected to an external fuel store, for example a store at the service garage. The fuel store is connected fluidically to the refueling coupling. On the vehicle side, the fuel flows from the refueling coupling through the inlet into the pressure vessel.

The controller can be configured to check the tightness of the pressure vessel system. For this purpose, it can be provided, for example, that the service device directly or indirectly determines the temporal change in the vessel pressure. Furthermore, the controller can be configured to build up and/or to maintain a test pressure in the pressure vessel system. Such a test is expedient, for example, after a service intervention, i.e., before the pressure system is operated again at the regular operating pressures.

The controller can furthermore be configured to inert the pressure vessel. For this purpose, the controller can have, for example, a supply of gas (e.g., in pressure cylinders). For example, nitrogen or carbon dioxide can be used as the inert gas. For the inerting, the pressure vessel is preferably filled repeatedly (e.g., three or five repetitions) with inert gas up to a certain filling degree or filling pressure and then emptied again. After the inerting and/or after the tightness test, the pressure vessel is preferably filled with a reference pressure. If the pressure vessel system is inerted, the system contains only small quantities, if any at all, of combustible gas. The risk of burning is therefore significantly reduced or eliminated.

Furthermore, the device can be configured to store helium, nitrogen and/or hydrogen, or in general a test gas. For example, the tightness test can be carried out with one of the three gases, preferably with helium.

The device preferably includes a connection for removing fuel into the surroundings. For example, the device can be connected to a garage-side fuel vent (e.g., a chimney).

The device can advantageously be configured to determine the purity of the fuel. If the fuel is contaminated, it can be conducted, for example, to the connection for the removal of fuel or the fuel cleaning or evaluation unit (e.g., to convert thermally, to operate turbines, etc.). If the fuel is sufficiently pure (e.g., is suitable for operation in a fuel cell), the fuel can be stored in a fuel store.

The service device can include further components, such as, for example, filters, valves, operating panels, sensors, and lines.

The service device can advantageously include a battery and a fuel cell or an internal combustion engine (possibly with a generator for charging a battery). The fuel cell and the internal combustion engine are expediently designed in such a manner that they supply the energy which is required for operating the service device. An external energy supply can then preferably be dispensed with. The internal combustion engine or the fuel cell could be operated with the fuel from the system to be defueled and could store the excess energy (HV store) or feed the same into the grid.

With the technology disclosed here, repair work and maintenance interventions can be carried out reliably and reproducibly. In addition, the service time can advantageously be reduced. The vehicle data which are determined can simply be stored for future use, e.g., for subsequent service work.

The technology disclosed here is also described by the following method.

A method for the service of a (CcH2 or CGH2) pressure vessel system of a motor vehicle, comprises the acts:

producing a fluid connection between a service device (in particular a service device as disclosed here) and the pressure vessel, preferably by coupling the service-device-side refueling coupling part to the motor-vehicle-side refueling coupling part of the motor vehicle; and activating the pressure vessel system, preferably by means of the controller disclosed here.

The method can furthermore have at least one of the following acts:

processing information about the state of the pressure vessel system, in particular pressure, temperature and filling level information;

reading the information from a control unit of the motor vehicle;

activating the pressure vessel system such that the fuel stored in the pressure vessel system is at least partially removed from the motor vehicle;

at least partially filling the pressure vessel system with fuel after the service work;

testing the tightness of the pressure vessel system;

inerting and pressure change scavenging the pressure vessel system;

analyzing the fuel which has been extracted from the pressure vessel system; and/or transferring the fuel to a connection for the removal of fuel or to a fuel store depending on the quality (e.g., purity) of the fuel.

The methods disclosed here are preferably carried out by the service device disclosed here, in particular the controller thereof. The individual steps of the methods disclosed here can be carried out in any desired sequence. The arrangement of the individual steps in the description and in the claims should not be interpreted as limiting. If reference is made in the case of the technology disclosed here to the fact that the controller is configured to carry out a function or an operation, the fact that the service device is configured overall to carry out the function or an operation is intended to be included simultaneously therewith.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE schematically shows the pressure vessel system disclosed here.

DETAILED DESCRIPTION OF THE DRAWING

The FIGURE schematically shows the pressure vessel system disclosed here. Fuel, e.g., hydrogen, is stored in the pressure vessel 200 at 700 bar. The pressure vessel 200 provides hydrogen for a fuel cell stack having a multiplicity of fuel cells 300 which are operated at a lower pressure level, e.g., 0.5 to 1 barg (=overpressure in relation to the atmospheric pressure). A shut-off valve 210 is provided at one end of the pressure vessel 200. Instead of just one pressure vessel 200 with a shut-off valve 210, a plurality of pressure vessels 200 having a plurality of shut-off valves 210 could also be provided. Furthermore, two pressure stages which each operate with a pressure reducer 211, 212 are provided in the system illustrated here. The first pressure stage reduces the pressure from 700 bar to an average pressure level of, for example, 11 to 13 bar (average pressure range). The second pressure stage reduces the pressure from the average pressure to the low pressure of the fuel cells. A mechanical proportional pressure regulator is used here as the first pressure reducer 211. In the second pressure stage, various technologies can be used for the second pressure regulator 212, e.g., injectors, Venturi nozzles and mechanical pressure regulators. In order to prevent bursting of the pipes should the pressure reducers 211, 212 malfunction, a pressure relief valve 213, 214 is provided in each case on the average pressure side and low pressure side. During the refueling of the pressure vessel system, fuel flows through the motor-vehicle-side refueling coupling part 221 and the refueling line portion 220 into the pressure vessel 200. Furthermore, a service port 219 is provided. The service port 219 is arranged in the average pressure range and serves for defueling the pressure vessel system. The service-device-side refueling coupling part K of the service device can be connectable to the motor-vehicle-side refueling coupling part 221 and/or to the service port 219. The components shown here with the reference signs 211, 212, 213, 214, 215, 219, 220 and 221 (and sometimes) 300 are part of the anode subsystem A. The direction of flow of the fuel is illustrated here by an arrow.

Furthermore, the pressure vessel system shown here includes a control unit 400 which is designed to control the pressure vessel system. The control unit 400 is connected to a master control unit 500 of the motor vehicle, or is integrated therein. The information with regard to the pressure vessel system can be transmitted by the control unit 400 or by the master control unit 500 to a diagnostic interface 600, to which the service device is connectable. Alternatively or in addition, the service device can be connectable to one of the control units 400, 500.

The service-side refueling coupling part K can open a non-return valve of the motor-vehicle-side refueling coupling part 221 or of the service port 219 such that the at least one pressure vessel can be defueled. For example, this can be undertaken mechanically, for example, by a pin in the refueling coupling part K pushing open the blocking mechanism counter to the closing direction of the non-return valve.

The service device can advantageously activate the pressure vessel system in such a manner that a valve of the anode subsystem prevents the supply of fuel to the at least one fuel cell. The pressure vessel can advantageously then be reliably defueled via the refueling line portion without the entire system having to be defueled. In parallel, that part of the anode subsystem which is arranged downstream of the valve could be further operated via the service port 219. For example, the fuel cell could be operated for further tests. This part of the anode subsystem could also be defueled separately at a later time.

The FIGURE shows a CGH2 system. However, the technology disclosed can also be applied to a CcH2 system.

The preceding description of the present invention serves only for illustrative purposes and not for the purpose of restricting the invention. Various amendments and modifications are possible within the scope of the invention without departing from the scope of the invention and the equivalence thereof.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A service device for providing a service to a motor vehicle, wherein the service device is not a part of the motor vehicle and wherein the service is not a refueling operation of a pressure vessel system of the motor vehicle which is performed at a filling station, comprising:
   a service-device-side refueling coupling part which is connectable to a motor-vehicle-side refueling coupling part and/or to a service port of the motor vehicle; and
   a controller, wherein the controller is configured to send control signals to a control unit of the motor vehicle to activate an actuator system of the pressure vessel system of the motor vehicle based on the control signals.

2. The service device as claimed in claim 1, wherein the controller is configured to process information about a state of the pressure vessel system.

3. The service device as claimed in claim 2, wherein the state is a pressure, a temperature, or a filling level.

4. The service device as claimed in claim 1, wherein the actuator system is a shut-off valve of a pressure vessel of the pressure vessel system.

5. The service device as claimed in claim 1, wherein the controller is configured to:
   activate the pressure vessel system such that fuel stored in the pressure vessel system is at least partially removed from the motor vehicle; and/or
   empty a pressure vessel of the pressure vessel system up to a minimal minimum pressure or entirely.

6. The service device as claimed in claim 1, wherein the controller is connectable to a diagnostic interface of the motor vehicle which serves as a diagnostic interface for vehicle parameters which do not relate to the pressure vessel system.

7. The service device as claimed in claim 1, wherein the service-device-side refueling coupling part is configured to open a non-return valve of the motor-vehicle-side refueling coupling part or of the service port.

8. A method for providing a service to a pressure vessel system of a motor vehicle by a service device, wherein the service device is not a part of the motor vehicle and wherein the service is not a refueling operation of the pressure vessel system of the motor vehicle which is performed at a filling station, comprising the acts of:
   providing a connection between the service device and the pressure vessel system; and
   sending control signals to a control unit of the motor vehicle by a controller of the service device and activating an actuator system of the pressure vessel system of the motor vehicle based on the control signals.

* * * * *